United States Patent [19]

Kissel

[11] Patent Number: 4,908,229
[45] Date of Patent: Mar. 13, 1990

[54] METHOD FOR PRODUCING AN ARTICLE CONTAINING A RADIATION CROSS-LINKED POLYMER AND THE ARTICLE PRODUCED THEREBY

[75] Inventor: Charles L. Kissel, Anaheim, Calif.

[73] Assignee: Union Oil of California, Brea, Calif.

[21] Appl. No.: 243,056

[22] Filed: Sep. 9, 1988

Related U.S. Application Data

[63] Continuation-in-part of Ser. No. 838,532, Mar. 11, 1986.

[51] Int. Cl.$^4$ .............................................. B05D 3/06
[52] U.S. Cl. ................................... 427/54.1; 523/222
[58] Field of Search ............... 523/222; 428/224, 198, 428/288, 262, 290, 394; 427/54.1

[56] References Cited

U.S. PATENT DOCUMENTS

| | | | |
|---|---|---|---|
| 3,214,492 | 10/1965 | Tacker | 260/878 |
| 3,345,336 | 10/1967 | Kuhlkamp et al. | 260/63 |
| 3,429,852 | 2/1969 | Skoultchi | 260/47 |
| 3,455,887 | 7/1969 | Levine | 260/78.5 |
| 3,459,790 | 8/1969 | Smith | 260/483 |
| 3,488,708 | 1/1970 | Smith | 96/84 |
| 3,554,987 | 1/1971 | Smith | 260/79.3 |
| 3,607,834 | 9/1971 | Marx et al. | 260/63 R |
| 3,658,878 | 4/1972 | Smith | 260/455.4 |
| 3,969,560 | 7/1976 | Lewis et al. | 428/90 |
| 4,054,232 | 10/1977 | Cawley | 222/107 |
| 4,072,769 | 2/1978 | Lidel | 427/38 |
| 4,098,696 | 7/1978 | Semmens | 210/903 |
| 4,148,987 | 4/1979 | Winey | 526/316 |
| 4,181,526 | 1/1980 | Blakey et al. | 430/67 |
| 4,294,739 | 10/1981 | Upson et al. | 260/29.6 |
| 4,296,226 | 10/1982 | Braun et al. | 526/316 |
| 4,408,018 | 10/1983 | Bartman et al. | 525/300 |
| 4,421,889 | 12/1983 | Braun et al. | 524/381 |
| 4,427,632 | 1/1984 | Okaniwa et al. | 422/56 |
| 4,438,232 | 3/1984 | Lee | 524/272 |
| 4,508,864 | 4/1985 | Lee | 524/107 |
| 4,670,381 | 6/1987 | Frickey et al. | 435/7 |
| 4,704,440 | 11/1987 | Goulding | 525/376 |
| 4,715,958 | 12/1987 | Fuchs | 210/630 |
| 4,732,951 | 3/1988 | Ahne et al. | 427/54.1 |
| 4,734,333 | 3/1988 | Leo et al. | 427/54.1 |
| 4,738,870 | 4/1988 | Green et al. | 427/54.1 |
| 4,748,044 | 5/1988 | Foltinger | 427/54.1 |
| 4,775,597 | 10/1988 | Birkmeyer | 427/54.1 |

FOREIGN PATENT DOCUMENTS

| | | |
|---|---|---|
| 1144486 | 3/1969 | United Kingdom . |
| 1504950 | 3/1978 | United Kingdom . |
| 1541909 | 3/1979 | United Kingdom . |

OTHER PUBLICATIONS

Koral et al., "Thermosetting Acrylic Emulsions Based on Hexakis(Methoxymethyl) Melamine," pp. 34–38.
Bufkin et al., *J. of Coatings Technology*, 50 (641): 41–55 (1978).
Upson, *J. of Polymer Science: Polymer Symposium* 72, 45–54 (1985).

*Primary Examiner*—Stanley Silverman
*Attorney, Agent, or Firm*—Greg F. Wirzbicki; Shlomo R. Frieman

[57] ABSTRACT

A polymer comprising pendant functional groups having the formula

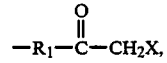

wherein $R_1$ is a divalent radical and X is selected from the group consisting of organoacyl and cyano, is cross-linked by exposure to radiation having a wavelength in the range of about $10^{-3}$ to about 400 nm.

52 Claims, No Drawings

METHOD FOR PRODUCING AN ARTICLE CONTAINING A RADIATION CROSS-LINKED POLYMER AND THE ARTICLE PRODUCED THEREBY

CROSS-REFERENCE TO RELATED APPLICATION

This application is a continuation-in-part of application Ser. No. 838,532, filed Mar. 11, 1986, the application being incorporated herein by reference.

BACKGROUND

The present invention relates to a method for forming an article by exposing a polymer to radiation having a wavelength of about $10^{-3}$ to about 400 nm to cure or cross-link the polymer and to articles containing radiation cross-linked polymers.

Many manufacturing processes employ radiation to cure or cross-link polymers. Exemplary examples of radiation are ultraviolet (UV) light having a wavelength of about 10 to about 400 nm, X-rays having a wavelength of about $10^{-2}$ to about 10 nm, and electron beam having a wavelength of about $10^{-3}$ to about $10^{-1}$ nm. The polymers can cross-link with themselves to increase their molecular weight. Typically, the resulting polymer exhibits new, and often more desirable, properties. Alternatively, the polymer can cross-link with or be covalently immobilized onto a substrate. This is desirable for those applications where a tenacious coating or bond is desired.

There are advantages of using radiation to cross-link polymers. For example, products for use in certain fields, e.g., health care, must be sterilized. One method of sterilizing articles involves exposing them to UV light. Products made with non-UV light curable polymers are first manufactured and then sterilized. This two-step procedure adds to the cost of the finished product. Although some polymers are radiation curable, most polymers are not.

Accordingly, there is a need for radiation-curable polymers that can be employed in radiation-curable methods for making articles, e.g., articles suitable for use in fields requiring sterilized products.

SUMMARY

The present invention satisfies this need by providing (a) a method for producing an article employing a radiation-curable polymer and (b) the article produced thereby. As used herein, the term "radiation" means electromagnetic rays having a wavelength of about $10^{-3}$ to about 400 nm. In one embodiment of the method of the instant invention, finished articles need not be subjected to a separate sterilization procedure because the articles are exposed to ultraviolet (UV) light during their manufacture.

According to this invention, an article is produced by the steps of (a) contacting a substrate, e.g., textiles, plastics, metal, and wood, with a polymer to form a substrate/polymer combination, and (b) curing or cross-linking the polymer by exposing the substrate/polymer combination to radiation having a wavelength capable of cross-linking (i.e., curing) the polymer. The polymer comprises a backbone and a plurality of pendant functional groups. An exemplary backbone is formed by combining a plurality of olefinically unsaturated carboxylic acid ester monomers. The pendant functional groups have the formula

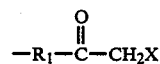

wherein $R_1$ is a divalent radical and X is selected from the group consisting of organoacyl and cyano. The polymer is generally cross-linked by exposing the substrate/polymer combination to UV light. Typically, the UV light has a wavelength in the range of about 10 to about 300 nm.

The radiation-curable polymer can be made by reacting a plurality of monomers with at least one polymerizable functional monomer having the formula

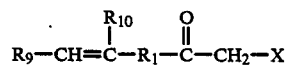

wherein X is as defined above and $R_9$ and $R_{10}$ are each independently selected from the group consisting of hydrogen, halo, thio, and monovalent organic radicals.

Articles produced by the method of the instant invention contain polymers that are cross-linked to themselves and/or covalently bonded to a substrate. In addition, in one embodiment of the invention when the articles are exposed to UV light during their manufacture, the articles are sterilized and suitable for use in applications requiring sterilized goods.

DETAILED DESCRIPTION

The present invention is directed to (a) a method for forming radiation-cured articles and (b) the articles produced thereby. More particularly, the method of the instant invention comprises the steps of (a) contacting a substrate with a polymer to form a substrate/polymer combination, and (b) curing or cross-linking the polymer by exposing the substrate/polymer combination to radiation having a wavelength capable of cross-linking the polymer. The polymer comprises a backbone and a plurality of pendant functional groups. In one version, the backbone of the polymer is formed by combining a plurality of olefinically unsaturated monomers. Exemplary monomers are olefinically unsaturated carboxylic acid ester monomers and salts thereof. Alternatively, the backbone of the polymer is formed by other polymerization reactions, e.g., condensation reactions.

The pendant functional groups have the formula

wherein $R_1$ is a divalent radical, and X is selected from the group consisting of organoacyl and cyano. $R_1$ can be or contains heteroatoms, such as oxygen, sulfur, phosphorus, and nitrogen. The heteroatoms are preferably selected from the group consisting of oxygen, sulfur, and nitrogen. In addition, $R_1$ can contain functional groups such as carbonyls, carboxy-esters, thio, and amino substituents. Although $R_1$ can also comprise aromatic, olefinic, or alkynyl unsaturation, $R_1$ is preferably saturated. Preferably, $R_1$ is a cyclic or acyclic divalent organic radical containing up to about 40 carbon atoms. Most preferably, $R_1$ is acyclic containing up to about 20 atoms in length, with any and all side groups each being up to about 6 atoms in length. Because of commercial availability, X preferably is organoacyl. X generally has the formula

   (II)

wherein $R_2$ is selected from the group consisting of hydrogen and monovalent organic radicals. (As used throughout the specification and claims, the term "organic radical" refers to any group containing at least one carbon atom, e.g., aliphatic and aromatic radicals, whether containing only hydrogen and carbon (i.e., hydrocarbon radicals) or further containing heteroatoms such as oxygen, sulfur, and nitrogen, and/or an inorganic substituent such as chlorine, bromine, and iodine. Accordingly, organic radials include, for example, substituted and unsubstituted alkyl, aryl, arylalkyl, alkylaryl, alkyloxy, aryloxy, arylalkyloxy, alkenyl, alkenyloxy, alkynl, alkynyloxy, and arylalkenyl radicals, and heteroatom-containing hydrocarbyl radicals. The heteroatoms are preferably selected from oxygen, sulfur, and nitrogen atoms.) Typically, $R_2$ contains up to about 10 atoms in addition to any hydrogen atoms present in the monovalent organic radical. Preferably, $R_2$ is H or an alkyl group containing up to about 6 carbon atoms. Methyl is most preferred for $R_2$.

An exemplary pendant functional group has the formula

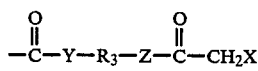   (III)

wherein $R_3$ is a divalent organic radical at least 2 atoms in length, Y and Z are each independently selected from the group consisting of O, S, and $NR_4$, with $R_4$ being selected from the group consisting of H and hydrocarbyl radicals containing up to about 6 carbon atoms. Preferably, $R_4$ is H or an alkyl group. Oxygen is preferred for Y and Z. Typically, $R_3$ contains up to about 40 atoms, but usually contains no more than about 20 atoms. $R_3$ can be cyclic or acyclic or can contain both cyclic and acyclic moieties. Exemplary cyclic $R_3$ groups include cycloalkylenes and phenylene. $R_3$ is preferably acyclic and is selected from the groups consisting of substituted and unsubstituted alkylenes, polyoxyalkylenes, polythioalkylenes, and polyaminoalkylenes. Unsubstituted alkylenes are most preferred for $R_3$. The substituted and unsubstituted polythio-, polyoxy-, and polyaminoalkylenes can be formed by the well known condensation of alkylene oxides, alkylene amines, glycols, diamines, and dithiols. For example, polyoxyalkylenes can be formed as follows:

   (IV)

wherein $R_5$ is H or a monovalent organic radical and the product of formula IV represents $HO(CHR_5-CH_2-O)_xH$, $HO(CH_2-CHR_5-O)_nH$, and mixtures thereof $R_5$ contains up to about 40 carbon atoms, but generally contains less than about 20 carbon atoms. Preferably, $R_5$ is H or an alkyl group containing up to about 10 carbon atoms.

Other exemplary $R_3$ radicals are:

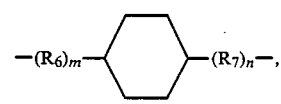   (V)

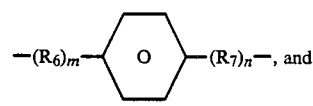   (VI)

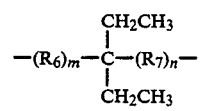   (VII)

wherein m is 0 or 1, n is 0 or 1, and $R_6$ is a divalent organic radical at least 1 atom in length, and $R_7$ is a divalent organic radical at least 1 atom in length. Typically $R_6$ and $R_7$ are alkylene groups containing up to about 3 carbon atoms in length.

The pendant functional groups are attached to the polymer backbone either as part of a polymerizable olefinically unsaturated monomer or by substitution onto a polymer by any suitable addition reaction. Typical addition reactions are schematically represented as follows:

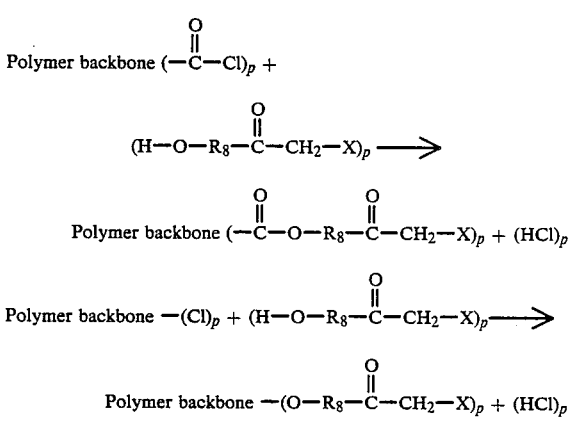

wherein p is an integer and $-O-R_8$ is $R_1$ in formula I, supra.

When the pendant functional groups are incorporated into the polymer backbone as part of a polymerizable monomer, the polymerizable monomer can have the formula

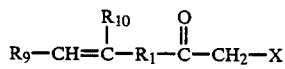   (VIII)

wherein X is as defined in formula I, supra, $R_9$ and $R_{10}$ are each independently selected from the group consisting of hydrogen, halo, thio, and monovalent organic radicals. Generally, $R_9$ and $R_{10}$ contain up to about 10 atoms other than hydrogen. Preferably, $R_9$ and $R_{10}$ and alkyl radicals having up to about 10 carbon atoms. An exemplary polymerizable monomer has the formula

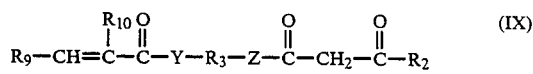   (IX)

wherein Y, Z, $R_2$, $R_3$, $R_9$, and $R_{10}$ are as defined above. A preferred class of polymerizable monomers due to their commercial availability, can be represented by the following formula:

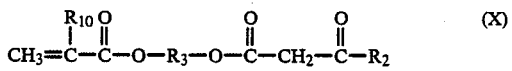
(X)

wherein $R_2$ is an alkyl group containing up to about 8 carbon atoms, $R_3$ is an alkylene group containing up to about 10 carbon atoms, and $R_{10}$ is hydrogen or an alkyl group containing up to about 12 carbon atoms. Exemplary monomers of formula X include:

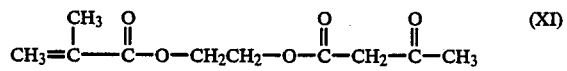
(XI)

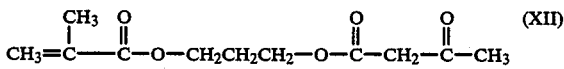
(XII)

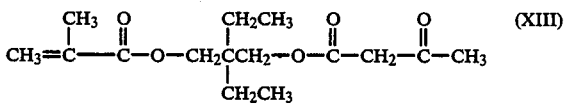
(XIII)

The polymer contains a sufficient amount of one or more of the pendant functional groups of formula I to enable the polymer to be radiation cross-linkable. Generally, the polymer contains at least about 0.5 weight percent of the pendant functional groups based on the total polymer content. More typically, the polymer contains at least about one weight percent of the pendant functional groups of formula I, supra. Usually, a pendent functional group concentration in excess of about 20 weight percent does not produce significantly greater technical benefits. Therefore, the pendant or functional groups are normally present in the polymer in a concentration of about 0.5 to about 20 weight percent and, more commonly, in the range of about 0.5 to about 10 weight percent based on the total polymer content. Pendant functional groups containing different $R_1$ and X radicals can be present in the same polymer. Alternatively, polymers containing different $R_1$ and X groups can be blended in the same solution or colloid.

Typically, radiation capable of cross-linking the polymer has a wavelength in the range of about $10^{-3}$ to about 400 nm. This range includes UV light having a wavelength of about 10 to about 400 nm, X-rays having a wavelength of about $10^{-2}$ to about 10 nm, and electron beam having a wavelength of about $10^{-3}$ to about 10 nm. UV light and electron beam are preferred radiation sources because they are more commonly used. In particular, UV is extensively used in industry. Since the energy of the UV light increases as the UV wavelength decreases, it is preferred that the UV light have a wavelength in the range of about 10 to about 300, more preferably in the range of about 10 to about 250, and most preferably in the range of about 10 to about 225 nm. However, it is believed that satisfactory cross-linking is obtained with UV light having a wavelength in the range of about 225 to about 265 nm.

The polymer can be applied to the substrate as part of an aqueous colloid or a solvent-containing solution. Alternatively, the polymer can be applied "neat", that is, substantially by itself.

Aqueous colloids and solvent-containing solutions of the polymers can be prepared by procedures known in the art. For instance, aqueous polymer colloids can be prepared by gradually adding each monomer simultaneously to an aqueous reaction medium at rates proportionate to the respective percentage of each monomer in the finished polymer. Polymerization is initiated and continued by providing a suitable polymerization catalyst in the aqueous reaction medium. Illustrative polymerization catalysts are free radical initiators and redox systems such as hydrogen peroxide, potassium and ammonium peroxydisulfate, dibenzoyl peroxide, hydrogen peroxide, lauryl peroxide, di-tertiary-butyl peroxide, and azobisisobutyronitrile. These catalysts can be employed either alone or together with one or more reducing components such as sodium bisulfate, sodium metabisulfate, glucose, ascorbic acid, and erythorbic acid. The polymerization reaction is continued with agitation at a temperature sufficient to maintain an adequate reaction rate until all added monomers are consumed. Monomer addition is usually continued until the latex (colloid) reaches a polymer concentration of about 10 to about 65 weight percent. Typically, latexes have a solids content of about 40 to about 60 weight percent.

Physical stability of the colloid is achieved by providing one or more surfactants (emulsifiers) in the aqueous reaction medium. Non-ionic, anionic, and/or amphoteric surfactants can be employed. Exemplary non-ionic surfactants are alkylpolyglycol ethers such as ethoxylation products of lauryl, oleyl, and stearyl alcohols or mixtures of such alcohols such as coconut fatty alcohol; and alkylphenol polyglycol ethers such as ethoxylation products of octyl- or nonylphenol, diisopropylphenol, triisopropylphenyl, and di- or tritertiarybutylphenol. Examples of anionic surfactants are alkali metal and ammonium salts of alkyl, aryl, and alkylaryl sulfonates, sulfates, phosphates, phosphonates, and carboxylates. Specific examples of anionic surfactants include, but are not limited to, sodium lauryl sulfate, sodium octylphenyl glycolether sulfate, sodium dodecylbenzene sulfonate, sodium lauryldiglycol sulfate, ammonium tritertiarybutylphenol, penta- and octa-glycol sulfates, and polyacrylic acid. Betaines and aminosulfonates are examples of amphoteric surfactants. Numerous other examples of suitable anionic, non-ionic, and amphoteric surfactants are disclosed in U.S. Pat. Nos. 2,600,831; 2,271,622; 2,271,623; 2,275,727; 2,787,604; 2,816,920; and 2,739,891, which references are incorporated herein by reference.

Colloidal stabilizing agents are optionally added to the aqueous polymer colloids either during or after the reaction period. Exemplary colloidal stabilizing agents include gum arabic, starch, alginates, and modified natural substances such as methyl-, ethyl, hydroxyalkyl-, and carboxymethyl- cellulose, and synthetic substances such as polyvinyl alcohol, polyvinyl pyrrolidone, and mixtures thereof. Fillers and/or extenders, such as dispersible clays, and colors, such as pigments and dyes, can also be added to the aqueous colloid either during or after polymerization.

Another advantage of the present invention is that solutions and colloids, and particularly colloids in aqueous medium, of the polymers employed in the instant invention have a lower viscosity than ester polymers not containing the functional monomers useful in this invention. Thus, the latexes have viscosities of about 100 centipoise or less, often about 50 centipoise or less, measured at 21° C. at a polymer concentration of 40 weight percent or more and even at about 50 weight percent or more.

The low viscosity behavior of the concentrated latexes employed in the present invention is atypical, particularly for polymers having comparable molecular weights and for latexes of comparable molecular size. Generally, polymer molecular weight maximums are about 150,000 or less and typically about 100,000 or less. The dispersed polymer particles can be of any size suitable for an intended use. However, since latex viscosity increases as particle size is reduced substantially below 120 nm, it is preferred that the polymer particle size be at least about 120 nm. Typically, the latexes have polymer particle sizes within the range of about 120 to about 300 nm as determined on the N-4 "Nanosizer" available from Colter Electronics, Inc. of Hialeah, Florida.

Due to the lower viscosity of solutions and colloids containing the polymers used in the instant invention, the polymer content of both the aqueous colloids and solutions can be increased without exceeding permissible viscosity limits. Similarly, the loading of the colloids and solutions with fillers such as clays, pigments, and other extenders can be increased. For instance, aqueous dispersions and polymer solutions can contain more than about 2 percent, often more than 5 percent, and even more than 10 percent fillers, colorants, and/or extenders.

Solutions of the polymers can be prepared by polymerizing the selected monomers in solvents in which both the monomers and the polymers are soluble. Suitable solvents include aromatic solvents and alcohols. Xylene and toluene are exemplary aromatic solvents. An exemplary alcohol is butanol. Polymerization initiators and reducing components, when employed, should be soluble in the selected solvent or mixture of solvents. Suitable polymerization initiators soluble in the above organic solvents include dibenzoyl peroxide, lauryl peroxide, and azobisisobutyronitrile. Erythobic and ascorbic acids are exemplary reducing components that are soluble in polar organic solvents.

In addition to being UV light curable, polymers containing the pendant functional groups of formula I, supra, also improve one or more physical properties of substrates relative to a similar substrate containing a similar polymer absent such pendant functional groups. For example, the pendant functional groups produce significant improvements in substrate properties when employed with polymers which contain significant amounts of polymerized, olefinically, unsaturated mono- and/or polycarboxylic acid esters and/or their salts. These latter polymers usually contain at least about 10 weight percent, often at least about 20 weight percent, and typically at least about 30 weight percent of olefinically unsaturated, carboxylic acid ester monomers other than the functional monomers of formula VIII, supra. Generally, the polymers contain at least about 50 weight percent, and commonly at least about 80 weight percent, of such ester comonomers. Exemplary ester comonomers are esters of olefinically unsaturated mono- or dicarboxylic acids and/or their salts having up to about 10 carbon atoms, and hydroxy-, amino-, or thio-substituted or unsubstituted alcohols, amines, and thiols having from 1 to about 30 carbon atoms, usually 1 to about 20 carbon atoms, per molecule. Illustrative unsaturated carboxylic acids are acrylic, methacrylic, fumaric, maleic, ad itaconic acid. Illustrative hydroxy-, amino-, and thio-substituted alcohols, amines, and thiols are glycerol, 1-hydroxy-5-thiododecane, and 2-amino-5-hydroxyhexane. Preferred ester comonomers, due primarily to cost and availability, are hydroxy-substituted and unsubstituted alcohol esters of acrylic and methacrylic acids such as butyl acrylate, 2-ethylhexyl acrylate, methyl methacrylate, and hydroxyethyl acrylate. Other desirable comonomers include acrylonitrile and acrylamide.

The functional monomers of formula VIII, supra, and the ester monomers can constitute the total polymer composition. Alternatively, the portion of the polymer molecule not accounted for by these two monomer classes can be any polymerizable, olefinically unsaturated monomer or combination of monomers. Illustrative of such other polymerizable monomers are vinyl esters of carboxylic acids, the acid moiety of which contains from 1 to about 20 carbon atoms (e.g., vinyl acetate, vinyl propionate, and vinyl isononoate); aromatic and aliphatic, alpha-beta-unsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having up to about 10 carbon atoms such as acrylic, methacrylic, crotonic, itaconic, and maleic acids. It has been found that minor amounts of olefinically unsaturated carboxylic acids and/or sulfoalkyl esters of such carboxylic acids and/or their salts significantly improve tensile strength and/or other physical properties of the finished textile material. Thus, it is preferred that the polymer contain at least about 0.1 weight percent, usually about 0.1 to about 10 weight percent, and typically about 0.1 to about 5 weight percent of (a) a polymerizable, olefinically unsaturated carboxylic acid having up to about 10 carbon atoms and/or (b) a sulfoalkyl ester of such acids such as sulfoethyl methacrylate, sulfoethyl itaconate, sulfomethyl malonate, and 2-acrylamino-2-methylpropane sulfonic acid, and/or (c) salts of (a) and/or (b).

As noted above, substrates that are suitable for use in the present invention include textiles. Textile substrates include woven and non-woven fibers. For the purpose of this invention, the term "fibers" encompasses relatively short fibers as well as longer fibers often referred to as "filaments". Fibers contain either polar or non-polar functional groups. Exemplary polar functional groups contained in fibers are hydroxy, etheral, carbonyl, carboxylic acid (including carboxylic acid salts), carboxylic acid esters (including thio esters), amides, and amines. Essentially all natural fibers, e.g., virgin wool and reclaimed cellulosic fibers such as cotton, wood fiber, coconut fiber, jute, hemp, and protenaceous materials such as wool and other animal fur, include one or more polar functional groups. Exemplary synthetic fibers containing polar functional groups are polyesters, polyamides, and carboxylated styrene-butadiene polymers. Typical polyamides include nylon-6, nylon-66, and nylon-610. Typical polyesters include Dacron, Fortrel, and Kodel brand polyesters. Typical acrylic fibers include Acrilan, Orlon, and Creslen brand acrylic fibers. Exemplary modacrylic fibers include Verel and Dynel brand modacrylic fibers. Other useful fibers which are also polar include synthetic carbon, silicon, and magnesium silicate (e.g. asbestos) polymer fibers and metallic fibers such as aluminum, gold, and iron fibers. Exemplary non-polar functional groups containing fibers are polyolefin and styrene-butadiene.

Fibers containing polar functional groups are widely employed in manufacturing a vast variety of textile materials, including wovens, nonwovens, knits, threads, yarns, and ropes. Minor amounts of polymers containing the pendant functional group of formula I, supra, are sufficient to enhance the physical properties of such articles, in particular tensile strength, abrasion resistance, scrub resistance, and/or shape retention, with little or no degradation of other desirable properties such as hand, flexibility, elongation, and physical and color stability. Polymer concentrations of at least about 5, generally at least about 8 weight percent based on the dry weight of the finished polymer-coated textile, are sufficient to obtain detectable physical property improvements in many textiles. Because of cost considerations, the polymer concentration rarely exceeds about 25 weight percent based on the dry weight of the finished polymer-coated textile. Typically, the polymer concentration is less than about 20 weight percent. Satisfactory results are achieved when the polymer concentration is within the range of about 10 to about 15 weight percent.

Although significantly greater improvements in physical properties are achieved by application of the polymers to polar group-containing fibers in contrast to relatively non-polar fibers, non-polar fibers can also be employed in the present invention. Furthermore, polar groups, such as carbonyl (e.g., keto) and hydroxy groups, can be introduced into polyolefins, styrene-butadiene polymers and other relatively non-polar fibers by known oxidation techniques.

The product property in which the most significant improvement results depends, to some extent, on the structure of the treated fiber assemblage. For instance, threads and ropes formed from relatively long, tightly wound or interlaced fibers and tightly woven textiles generally possess significant tensile strength in their native state. Accordingly, the percentage increase in tensile strength resulting from polymer treatment will be less, on a relative basis, than it is with other products such as loose-wovens, knits, and non-wovens which have a relatively lower tensile strength in their native form. However, significant improvements in abrasion resistance and scrub resistance are achieved in threads, ropes, and tightly woven textiles. Furthermore, in loose-woven textiles and knitted fabrics, significant improvements can be achieved for shape retention (including retention of the relative spacing of adjacent woven strands), abrasion resistance, and scrub resistance.

Significant advantages of the present invention are also obtained for non-woven fibers. Non-woven fibers depend primarily on the strength and persistence of the fiber-polymer bond for their physical properties and for the retention of such properties with use. Bonded non-woven fabrics, such as the textile articles of this invention, can be defined generally as assemblies of fibers held together in a random or oriented web or mat by a bonding agent. While many non-woven materials are manufactured from crimped fibers having lengths of about 0.5 to about 5 inches, shorter or longer fibers can be employed. Exemplary utilities for non-woven textiles are hospital sheets, gowns, masks, as well as roadbed underlayment supports, diapers, roofing materials, napkins, coated fabrics, papers of all varieties, and tile backings (for ungrouted tile prior to installation). The physical properties of non-woven fibers range all the way from stiff, board-like homogeneous and composite paper products to soft drapeable textiles (e.g., drapes and clothing), and wipes.

Non-woven products can be generally divided into categories characterized as "flat" and "highloft" goods. Each category includes both disposable and durable products. Presently, the major end uses of disposable flat non-woven goods include diaper cover stock, surgical drapes, gowns, face masks, bandages, industrial work clothes, consumer and industrial wipes and towels such as paper towels, and feminine hygiene products. Current major uses of durable flat non-woven goods include apparel interlinings and interfacings, drapery and carpet backings, automotive components (such as components of composite landau automobile tops), carpet and rug backings, and construction materials, such as roadbed underlayments employed to retain packed aggregate, and components of composite roofing materials, insulation, pliable or flexible siding, and interior wall and ceiling finishes.

The highloft non-woven goods can be defined broadly as bonded, non-woven fibrous structures of varying bulks that provide varying degrees of resiliency, physical integrity, and durability depending on end use. Current major uses of highloft non-wovens include the manufacture of quilts, mattress pads, mattress covers, sleeping bags, furniture underlayments (padding), air filters, carpet underlayments (e.g., carpet pads), winter clothing, shoulder and bra pads, automotive, home and industrial insulation and paddings, padding and packaging for stored and shipped materials and otherwise hard surfaces (e.g., automobile roof tops, chairs, etc.), floor care pads for cleaning, polishing, buffing, and stripping, house robes (terrycloth, etc.), crib kick pads, furniture and toss pillows, molded packages, and kitchen and industrial scrub pads.

The polymers and methods can be used to manufacture all such non-wovens, and they are particularly useful for the manufacture of non-wovens free of, or having reduced levels of, formaldehyde or other potentially toxic components, and which have relatively high wet and dry tensile strength, abrasion resistance, color stability, stability to heat, light, detergent, and solvents, flexibility, elongation, shape retention, and/or acceptable "hand". The polymers are also particularly useful in manufacturing methods which require relatively short cure time (rapid bonding rate), relatively high polymer-to-fiber cohesion, temperature stability (during curing and subsequent treatment), and/or the use of slightly acidic, neutral or alkaline application solutions or dispersions.

The method of the present invention can be used to manufacture articles that are suitable for use in applications requiring sterilized products, e.g., the health care industry. Exemplary sterilized products include hospital gowns, masks, and bandages.

The polymers can be applied to the selected substrate by any of the procedures employed to apply other polymeric materials to the particular substrate. For example, a textile substrate can be immersed in the polymer solution or colloid in a typical dip-tank operation, sprayed with the polymer solution or colloid, or contacted with rollers or textile "printing" apparatus employed to apply polymeric colloids and solutions to textile substrates. Polymer concentration in the applied solution or colloid can vary considerably depending upon the procedures and apparatus employed to apply the polymer and the desired total polymer loading (polymer content) of the finished textile. Typically, the polymer concentration ranges from about 1 percent to about 60 percent. However, most applications involve solutions or colloids containing about 5 to about 60 weight percent latex solids.

Textile fiber assemblies wetted with substantial quantities of polymer solutions or latexes are typically squeezed with pad roll, knip roll, and/or doctor blade assemblies to remove excess solution or dispersion and, in some instances, to "break" and coalesce the latex and improve polymer dispersion, distribution, and fiber wetting.

The polymer is cross-linked by exposing the polymer/substrate combination to radiation capable of cross-linking the polymer. A rapid curing or cross-linking rate is important in essentially all methods of applying polymers to textiles and other substrates. For example, it is generally desirable to quickly reduce surface tackiness and increase fiber-to-fiber bond strength as soon as possible in the manufacture of loose woven textiles, knits, and non-wovens including all varieties of paper. Most often, adequate bond strength and sufficiently low surface tackiness must be achieved in textiles before they can be subjected to any significant stresses and/or subsequent processing. Accordingly, it is preferred that the polymer be capable of cross-linking when exposed to radiation for a period of less than about 15 minutes.

EXAMPLES

In following examples, polymers containing pendant functional groups are synthesized. The polymers are applied to a substrate and cross-linked using UV light. The tensile strength of the UV cured polymer/substrate article is demonstrated.

EXAMPLE 1

Preparation of Stock Polymer Latex

A surfactant-monomer pre-emulsion was formed by emulsifying about 5.3 gm itaconic acid, about 10.6 gm acrylamide, about 251.7 gm butyl acrylate, about 255.8 gm ethyl acrylate, about 32.7 gm polyethoxylated nonylphenol surfactant containing about 40 moles ethylene oxide per mole, about 10.6 gm polyethoxylated nonylphenol surfactant containing about 50 moles ethylene oxide per mole, and about 4.5 gm sodium lauryl sulfate surfactant (about 30 percent active) in about 133.6 gm water. A reactor was initially charged with about 353.4 gm deionized water and about 1.1 gm dissolved ammonium hydrogen phosphate to which about 70 ml of the monomer-surfactant pre-emulsion was then added. The resulting mixture was purged with nitrogen and heated to about 43° C. Sodium metabisulfite (about 0.45 gm) and potassium peroxydisulfate (about 0.72 gm) were then added with agitation, and the reactor was allowed to exotherm to about 60°0 C. The remainder of the monomer-surfactant pre-emulsion was then gradually metered into the reactor along with about 57 ml of a solution formed by dissolving about 4.8 gm potassium peroxydisulfate in about 100 ml water and about 31 ml of a solution formed by dissolving about 4.4 gm sodium metabisulfite in about 100 ml water over a period of about 3 hours. The reactor's temperature was maintained at about 60° C. throughout the reaction. Tertiarybutyl hydroperoxide (about 0.4 gm) was then added to assure polymerization of all monomers. The resulting latex contained about 48.4 weight percent latex solids and had a pH of about 2.9. The latex solids had a polymeric composition of about 1 weight percent itaconic acid, about 2 weight percent acrylamide, about 48 weight percent butyl acrylate, and about 49 weight percent ethyl acrylate based upon the total weight of the polymer.

EXAMPLE 2

Preparation of Polymer Containing Pendant Functional Group

A latex of a polymer containing about 4 weight percent acetoacetoxyethylacrylate (AAEA) was prepared using the compositions and procedures described in Example 1, supra, with the exception that sufficient AAEA was incorporated in the monomer-surfactant pre-emulsion to form a polymer containing about 4 weight percent AAEA. The concentration of the other monomers was reduced proportionately to about 1 weight percent itaconic acid, about 1.9 weight percent acrylamide, about 46.1 weight percent butyl acrylate, and about 47 weight percent ethyl acrylate. All other compositions and conditions were as described in Example 1.

EXAMPLE 3

Preparation of UV Cross-linked Polymer Coated Paper

Chromatographic grade filter paper was saturated with the polymer latex prepared in Example 2. The saturated filter paper was air dried. The dried filter paper was cut into one-inch by six-inch strips. Each strip was vertically suspended approximately seven inches away from eight circumferentially located, 18-inch fluorescent tubes. Adjacent fluorescent tubes were spaced approximately 45° apart. Each fluorescent tube was capable of emitting UV light having a wavelength of about 254 nm. As shown in Table I, infra, each strip of paper was exposed to either four equally spaced or all eight UV light sources for various times. While the latex polymer in each strip was being cured, the ambient temperature proximate the strip was as stated in Table I, infra.

EXAMPLE 4

Preparation of Heat Cured Polymer Coated Paper

Chromatographic grade filter paper was saturated with the polymer latex of Example 2. The saturated filter paper was air dried. The dried filter paper was cut in quarters. Each quarter section was heat cured at the temperatures stated in Table I, infra, for about 3 minutes. The oven dried sections were then cut into one-inch by six-inch strips.

EXAMPLE 5

Tensile Strength Test

One-inch by six-inch strips of the UV cross-linked sample of Example 3 or the heat cured strips of Example 4 were tested for wet tensile strength by dipping each strip in a 1 percent solution of Aerosol OT brand surfactant for about 4 seconds and measuring tensile on an Instron Model 1122 brand tensile gauge instrument. (Aerosol OT brand surfactant is manufactured by American Cyanamid, Inc.) Each wet tensile strength obtained is listed in Table I.

TABLE I

WET TENSILE STRENGTH (lb)

| Cure Time, Minutes | Thermal Cure, 66° C. | Thermal Cure, 107° C. | Thermal Cure, 149° C. | UV Cure, 4/8 Tubes, 43° C. | UV Cure, 8/8 Tubes, 51° C. |
|---|---|---|---|---|---|
| 0 | 0.4 | 0.4 | 0.4 | 0.4 | 0.4 |
| 0.5 | 1.0 | 1.2 | 2.4 | — | — |
| 1 | — | — | — | 2.4 | 2.9 |
| 3 | 1.0 | 1.8 | 5.0 | 2.8 | 3.1 |
| 5 | 1.0 | 2.1 | 5.3 | — | — |
| 6 | — | — | — | 3.0 | 3.2 |
| 10 | 1.0 | 2.8 | 6.0 | — | — |
| 15 | — | — | — | 3.4 | 3.7 |

The data of Table I demonstrate that UV light can effectively cure a polymer having pendant functional groups within the scope of formula I, supra. In addition, the data also indicate that the UV cured polymer improves the wet tensile strength of a treated substrate. Furthermore, a comparison of the wet tensile strength of UV cured articles with articles thermally cured at 66° C. and 107° C. indicates that UV cured articles attain a higher wet tensile strength in a shorter period of time than articles thermally cured at a much higher temperature. The ability of UV light to quickly cure articles at low temperatures helps avoid substrate degradation and makes UV curing a very attractive commercial process.

EXAMPLE 6

Additional UV Cure Studies

Latexes of a polymer containing various amounts of AAEA were prepared using the compositions and procedures of Example 2, supra. Four separate portions of each latex were isolated and the pH of each portion was adjusted to either about 2, 4, 6 or 8. Strips of chromatographic grade filter paper were saturated with each pH-adjusted portion and cured according to the procedures of Examples 3 and 4. The wet tensile strengths of the cured polymer coated strips are set forth in Table II, infra.

TABLE II

Wet Tensile Strength (lb) at 18% Add-On

| AAEA, Wt. % | Percent Add-On[1] | UV Cure, 8/8 Tubes, at 44° C., Min. | | | | | | Heat Cured at 44° C. For 15 Min. | Bath pH |
|---|---|---|---|---|---|---|---|---|---|
| | | 0 | 0.5 | 1 | 3 | 6 | 15 | | |
| 0 | 22.2 | 0.4 | 0.5 | 0.5 | 0.6 | 0.7 | 0.8 | 0.5 | 2 |
| 0 | 22.0 | 0.6 | 0.6 | 0.6 | 0.7 | 0.8 | 0.8 | 0.6 | 4 |
| 0 | 27.2 | 0.5 | 0.5 | 0.6 | 0.6 | 0.6 | 0.7 | 0.5 | 6 |
| 0 | 26.0 | 0.5 | 0.5 | 0.5 | 0.5 | 0.6 | 0.7 | 0.4 | 8 |
| 2 | 21.6 | 0.5 | 0.5 | 0.5 | 0.7 | 0.9 | 1.6 | 0.5 | 2 |
| 2 | 26.0 | 0.6 | 0.6 | 0.6 | 0.7 | 0.8 | 1.1 | 0.7 | 4 |
| 2 | 24.1 | 0.7 | 0.7 | 0.7 | 0.8 | 0.9 | 1.2 | 0.7 | 6 |
| 2 | 22.0 | 0.7 | 0.8 | 0.8 | 1.0 | 1.1 | 1.4 | 0.9 | 8 |
| 5 | 24.2 | 0.5 | 0.5 | 0.5 | 0.6 | 0.9 | 1.5 | 0.5 | 2 |
| 5 | 25.6 | 0.6 | 0.6 | 0.7 | 1.0 | 1.3 | 1.8 | 0.7 | 4 |
| 5 | 21.7 | 0.8 | 0.9 | 1.0 | 1.3 | 1.5 | 2.0 | 0.9 | 6 |
| 5 | 24.8 | 0.7 | 0.8 | 0.8 | 1.0 | 1.2 | 1.6 | 0.7 | 8 |
| 10 | 24.8 | 0.4 | 0.5 | 0.5 | 0.7 | 1.1 | 1.8 | 0.4 | 2 |
| 10 | 23.3 | 0.7 | 0.7 | 0.8 | 0.9 | 1.1 | 1.6 | 0.7 | 4 |
| 10 | 27.3 | 0.7 | 0.7 | 0.9 | 1.0 | 1.3 | 1.7 | 0.7 | 6 |
| 10 | 25.7 | 0.7 | 0.8 | 0.8 | 1.0 | 1.2 | 1.5 | 0.8 | 8 |

[1]Percent add-on can be represented by the formula (Y − X)/X 100% wherein X is the initial weight of a strip of chromatographic filter paper and Y is the weight of the cured, polymer coated filter paper.

The data set forth in Table II demonstrate that polymers prepared without AAEA, an exemplary, monomer within the scope of formula VIII, supra, failed to significantly improve tensile strength as a result of UV curing. The data also sustantiate that UV cured articles attain a higher wet tensile strength in a shorter period of time than articles thermally cured at the same temperature.

EXAMPLE 7

Further UV Cure Studies

Cured polymer coated filter paper strips were prepared as described in Example 6 with one modification. The modification comprised forming the surfactant-monomer pre-emulsion by emulsifying about 4.00 gm itaconic acid, about 7.95 gm acrylamide, about 188.78 gm butyl acrylate, about 191.85 gm ethyl acrylate, and about 130.85 gm vinyl acetate. The non-monomer ingredients of the surfactant-monomer pre-emulsion were the same as employed in Example 1. The wet tensile strengths of cured polymer coated strips prepared in accordance with this example are set forth in Table III, infra.

TABLE III

Wet Tensile Strength (lb) at 18% Add-On

| AAEA, Wt. % | Percent Add-On[1] | UV Cure, 8/8 Tubes, at 44° C., Min. | | | | | | Heat Cured at 44° C. For 15 Min. | Bath pH |
|---|---|---|---|---|---|---|---|---|---|
| | | 0 | 0.5 | 1 | 3 | 6 | 15 | | |
| 0 | 20.2 | 1.3 | 1.3 | 1.2 | 1.2 | 1.3 | 1.4 | 1.3 | 2 |
| 0 | 20.0 | 1.3 | 1.3 | 1.2 | 1.2 | 1.3 | 1.4 | 1.2 | 4 |
| 0 | 20.3 | 1.2 | 1.3 | 1.3 | 1.3 | 1.3 | 1.4 | 1.2 | 6 |
| 0 | 20.0 | 1.3 | 1.3 | 1.3 | 1.3 | 1.4 | 1.4 | 1.2 | 8 |
| 2 | 20.5 | 1.3 | 1.2 | 1.3 | 1.4 | 1.5 | 2.0 | 1.2 | 2 |
| 2 | 20.6 | 1.2 | 1.3 | 1.3 | 1.5 | 1.6 | 2.0 | 1.3 | 4 |
| 2 | 19.9 | 1.5 | 1.6 | 1.6 | 1.7 | 1.8 | 2.1 | 1.4 | 6 |
| 2 | 19.9 | 1.5 | 1.5 | 1.6 | 1.7 | 1.8 | 2.1 | 1.4 | 8 |
| 5 | 17.5 | 1.5 | 1.5 | 1.5 | 1.6 | 1.9 | 3.4 | 1.4 | 2 |
| 5 | 17.5 | 1.5 | 1.6 | 1.6 | 1.8 | 2.1 | 2.6 | 1.5 | 4 |
| 5 | 17.6 | 1.5 | 1.6 | 1.6 | 1.9 | 2.0 | 2.6 | 1.5 | 6 |
| 5 | 18.1 | 1.5 | 1.5 | 1.6 | 1.8 | 2.0 | 2.4 | 1.4 | 8 |
| 10 | 18.1 | 1.3 | 1.3 | 1.3 | 1.5 | 1.9 | 3.0 | 1.3 | 2 |
| 10 | 17.6 | 1.4 | 1.5 | 1.5 | 1.7 | 2.1 | 2.8 | 1.4 | 4 |
| 10 | 17.9 | 1.5 | 1.7 | 1.7 | 1.8 | 2.0 | 2.6 | 1.6 | 6 |
| 10 | 17.5 | 1.8 | 1.7 | 1.7 | 2.0 | 2.2 | 2.8 | 1.6 | 8 |

[1]See Table II, footnote 1, supra.

The data set forth in Table III support the observations made regarding the data of Table II, supra, Although the present invention has been described in considerable detail with reference to certain preferred versions thereof, other versions are possible. For example, the polymers can be coated on substrates other than those specifically mentioned above. In addition, the polymer need not be coated onto a substrate in order to be UV cured. Instead, the polymer can be confined to a desired shaped and then UV cured. Therefore, the spirit and scope of the appended claims should not necessarily be limited to the description of preferred versions contained therein.

What is claimed is:

1. A method of producing an article comprising the steps of:
    (a) contacting a substrate with a polymer to form a substrate/polymer combination, the polymer comprising (i) at least about 10 weight percent olefinically unsaturated, carboxylic acid ester monomers, (ii) a backbone and (iii) a plurality of pendant functional groups, the pendant functional groups having the formula selected from the group consisting of

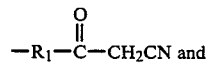

wherein
R₁ is a divalent radical; and
R₂ is selected from the group consisting of hydrogen and alkyl, arylalkyl, alkyloxy aryloxy, arylalkyloxy, alkenyl, alkenyloxy, alkynyl, alkynyloxy, and arylalkenyl radicals; and
(b) curing the polymer by exposing the substrate/polymer combination to radiation having a wavelength within the range of about $10^{-3}$ to about 400 nm.

2. The method of claim 1 wherein the radiation is ultraviolet light.

3. The method of claim 2 wherein the ultraviolet light has a wavelength in the range of about 10 to about 300 nm.

4. The method of claim 2 wherein the ultraviolet light has a wavelength in the range of about 10 to about 250 nm.

5. The method of claim 2 wherein the ultraviolet light has a wavelength of about 10 to about 225 nm.

6. The method of claim 2 wherein the ultraviolet light has a wavelength of about 225 to about 265 nm.

7. The method of claim 1 wherein the substrate/polymer combination is exposed to the radiation for a period of time of up to about 15 minutes.

8. The method of claim 1 wherein the polymer is a constituent of a solution.

9. The method of claim 1 wherein the polymer is a constituent of a colloid.

10. The method of claim 9 wherein the colloid has a pH of about 2 to about 8.

11. The method of claim 1 wherein R₂ is hydrogen or an alkyl group containing up to about 10 atoms in addition to any hydrogen atoms present in the alkyl group.

12. The method of claim 1 wherein pendant functional groups have the formula

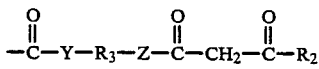

wherein
Y is selected from the group consisting of O, S, and NR₄;
Z is selected from the group consisting of O, S, and NR₄:
R₃ is a divalent organic radical at least 2 atoms in length; and
R₄ is selected from the group consisting of H and hydrocarbyl radicals having up to 6 carbon atoms.

13. The method of claim 12 wherein Y is O.

14. The method of claim 12 wherein Z is O.

15. The method of claim 12 wherein R₃ comprises up to about 40 atoms.

16. The method of claim 12 wherein R₃ comprises up to about 20 atoms.

17. The method of claim 12 wherein R₃ is selected from the group consisting of substituted and unsubstituted alkylenes, polyoxyalkylenes, polythiolalkylenes, and polyaminoalkylenes.

18. The method of claim 12 wherein R₃ is selected from the group consisting of

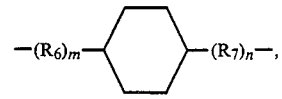

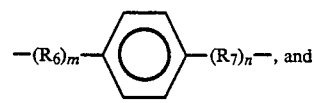

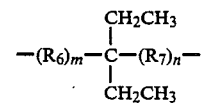

wherein
m is 0 or 1;
n is 0 or 1;
R₆ is a divalent organic radical at least one atom in length; and
R₇ is a divalent organic radical at least one atom in length.

19. The method of claim 1 wherein R₂ contains up to about 6 carbon atoms.

20. The method of claim 19 wherein R₂ is methyl.

21. The method of claim 1 wherein the substrate is a textile.

22. The method of claim 1 further comprising the step of forming the backbone by combining one or more olefinically unsaturated monomers.

23. The method of claim 22 wherein at least one of the olefinically unsaturated monomers has the formula

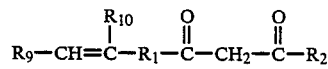

wherein R₉ and R₁₀ are each independently selected from the group consisting of hydrogen, halo, thio, and monovalent organic radicals.

24. The method of claim 23 wherein at least one of the monomers is selected from the group consisting of (a) monocarboxylic acid esters, (b) polycarboxylic acid esters, (c) salts of (a) and (b), and (d) mixtures thereof.

25. The method of claim 23 wherein at least one of the monomers is selected from the group consisting of acrylic acid, itaconic acid, hydroxyethyl acrylate, acrylonitrile, and acrylamide.

26. The method of claim 1 wherein the polymer comprises at least about 0.5 weight percent of the pendant functional groups.

27. The method of claim 1 wherein the polymer comprises up to about 20 weight percent of the pendant functional groups.

28. A method of producing an article comprising the steps of:
(a) reacting one or more monomers with at least one polymerizable functional monomer to form a polymer, the polymer comprising at least about 10 weight percent olefinically unsaturated, carboxylic acid ester monomers, and the polymerizable functional monomer having the formula:

wherein
- $R_1$ is a divalent organic radical of at least 3 atoms in length;
- $R_2$ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals;
- $R_9$ is selected from the group consisting of hydrogen, halo, thio, and monovalent organic radicals;
- $R_{10}$ is selected from the group consisting of hydrogen, halo, thio, and monovalent organic radicals;

(b) contacting the polymer with a substrate to form a substrate/polymer combination; and (c) curing the substrate/polymer combination by exposing the substrate/polymer combination to ultraviolet light.

29. The method of claim 28 wherein the polymerizable functional monomer has the formula

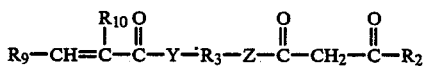

wherein
- Y is selected from the group consisting of O, S, and $NR_4$;
- Z is selected from the group consisting of O, S, and $NR_4$;
- $R_3$ is a divalent organic radical having at least two atoms; and
- $R_4$ is selected from the group consisting of hydrogen and hydrocarbyl radicals containing up to about 6 carbon atoms.

30. The method of claim 28 wherein the polymerizable functional monomer has the formula selected from the group consisting of

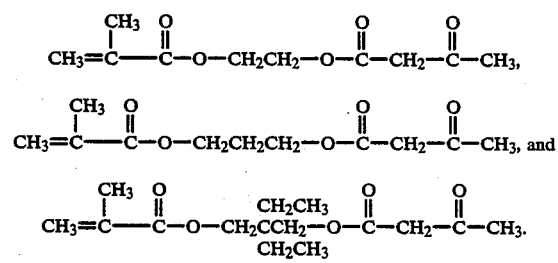

31. A method of curing a polymer comprising the step of exposing the polymer to radiation having a wavelength within the range of about $10^{-3}$ to about 400 nm, the polymer comprising (i) a backbone, (ii) at least about 10 weight percent olefinically unsaturated, carboxylic acid ester monomers, and (iii) a plurality of pendant functional groups, the pendant functional groups having the formula selected from the group consisting of

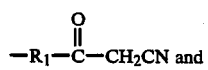 and

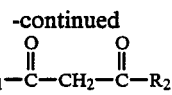

wherein
- $R_1$ is a divalent radical; and
- $R_2$ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals.

32. The method of claim 31 wherein the radiation is ultraviolet light.

33. The method of claim 31 wherein $R_2$ is hydrogen or an alkyl group containing up to about 10 atoms in addition to any hydrogen atoms present in the alkyl group.

34. The method of claim 31 wherein pendant functional groups have the formula

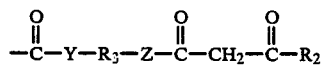

wherein
- Y is selected from the group consisting of O, S, and $NR_4$;
- Z is selected from the group consisting of O, S, and $NR_4$;
- $R_3$ is a divalent organic radical at least 2 atoms in length; and
- $R_4$ is selected from the group consisting of H and hydrocarbyl radicals having up to 6 carbon atoms.

35. The method of claim 31 further comprising the step of forming the backbone by combining one or more olefinically unsaturated monomers.

36. The method of claim 35 wherein at least one of the olefinically unsaturated monomers has the formula

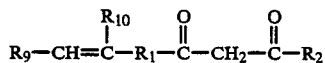

wherein $R_9$ and $R_{10}$ are each independently selected from the group consisting of hydrogen, halo, thio, and monovalent organic radicals.

37. A method of curing a polymer comprising the step of exposing the polymer to radiation having a wavelength within the range of about $10^{-3}$ to about 400 nm, the polymer comprising at least about 10 weight percent olefinically unsaturated, carboxylic acid ester monomers, and being formed by reacting one or more monomers with at least one polymerizable functional monomer having the formula:

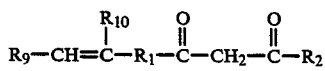

wherein
- $R_1$ is a divalent radical;
- $R_9$ and $R_{10}$ are each independently selected from the group consisting of hydrogen, halo, thio, and monovalent organic radicals; and
- $R_2$ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals.

38. The method of claim 37 wherein the polymerizable functional radical has the formula:

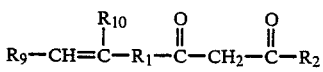

wherein R₂ is selected from the group consisting of hydrogen and alkyl groups containing up to about 10 atoms in addition to any hydrogen atoms present in the alkyl group.

39. The method of claim 37 wherein the polymerizable functional monomer has the formula

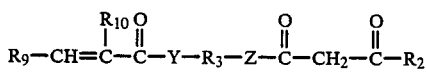

wherein
Y is selected from the group consisting of O, S, and NR₄;
Z is selected from the group consisting of O, S, and NR₄;
R₃ is a divalent organic radical having at least two atoms; and
R₄ is selected from the group consisting of hydrogen and hydrocarbyl radicals containing up to about 6 carbon atoms.

40. The method of claim 37 wherein the polymerizable functional monomer has the formula selected from the group consisting of

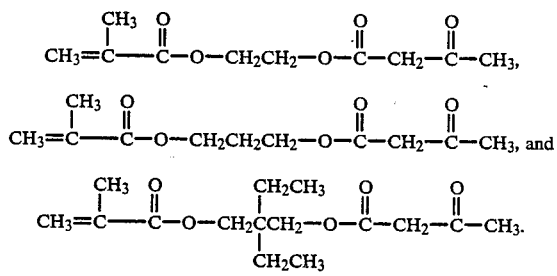

41. The method of claim 37 wherein the polymer is exposed to radiation for a period of up to about 15 minutes.

42. A method for producing an article comprising the steps of:
(a) contacting a substrate with a polymer to form a substrate/polymer combination, the polymer comprising a backbone and a plurality of pendant functional groups, the pendant functional groups having the formula selected from the group consisting of

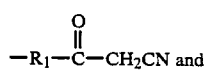 and

wherein
R₁ is a divalent radical; and
R₂ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals; and (b) curing the polymer by exposing the substrate/polymer combination to radiation having a wavelength within the range of about 10⁻³ to about 400 nm.

43. The method of claim 42 wherein R₂ is hydrogen or an alkyl group containing up to about 10 atoms in addition to any hydrogen atoms present in the alkyl group.

44. The method of claim 42 wherein R₂ is hydrogen or an alkyl group comprising up to about 6 carbon atoms.

45. The method of claim 42 wherein R₂ is methyl.

46. The method of claim 42 wherein pendant functional groups have the formula

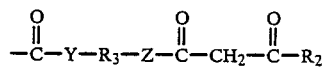

wherein
Y is selected from the group consisting of O, S, and NR₄;
Z is selected from the group consisting of O, S, and NR₄;
R₃ is a divalent organic radical at least 2 atoms in length; and
R₄ is selected from the group consisting of H and hydrocarbyl radicals having up to 6 carbon atoms.

47. The method of claim 46 wherein R₂ is selected from the group consisting of hydrogen or an alkyl group containing up to about 10 atoms in addition to any hydrogen atoms present in the alkyl group.

48. The method of claim 46 wherein R₂ is hydrogen or an alkyl group comprising up to about 6 carbon atoms.

49. The method of claim 46 wherein R₂ is methyl.

50. A method of producing an article comprising the steps of:
(a) reacting one or more monomers with at least one polymerizable functional monomer to form a polymer, the polymerizable functional monomer having the formula:

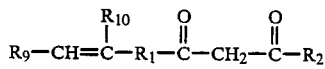

wherein
R₁ is a divalent organic radical of at least 3 atoms in length;
R₂ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals;
R₉ is selected from the group consisting of hydrogen, halo, thio, and monovalent organic radicals;
R₁₀ is selected from the group consisting of hydrogen, halo, thio, and monovalent organic radicals;
(b) contacting the polymer with a substrate to form a substrate/polymer combination; and
(c) curing the substrate/polymer combination by exposing the substrate/polymer combination to ultraviolet light.

51. A method for curing a polymer comprising the step of exposing the polymer to radiation having a wavelength within the range of about 10⁻³ to about 400 nm, the polymer comprising a backbone and a plurality of pendant functional groups, the pendant functional groups having the formula selected from the group consisting of:

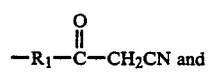

and

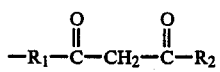

wherein
R₁ is a divalent radical; and
R₂ is selected from the group consisting of hydrogen and alkyl, arylalkyl, alkyloxy, aryloxy, arylalkyloxy, alkenyl, alkenyloxy, alkynyl, alkynyloxy, and arylalkenyl radicals.

52. A method for curing a polymer comprising the step of exposing the polymer to radiation having a wavelength within the range of about $10^{-3}$ to about 400 nm, the polymer being formed by reacting one or more monomers with at least one polymerizable functional monomer having the formula:

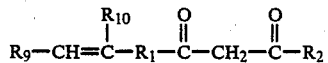

wherein
R₁ is a divalent organic radical;
R₂ is selected from the group consisting of hydrogen and alkyl arylalkyl, alkyloxy, aryloxy, arylalkyloxy, alkenyl, alkenyloxy, alkynyl, alkynyloxy, and arylalkenyl radicals; and
R₉ and R₁₀ are each independently selected from the group consisting of hydrogen, halo, thio, and monovalent organic radicals.

* * * * *

UNITED STATES PATENT AND TRADEMARK OFFICE
CERTIFICATE OF CORRECTION

PATENT NO. : 4,908,229

DATED : March 13, 1990

INVENTOR(S) : Charles L. Kissel

It is certified that error appears in the above-identified patent and that said Letters Patent is hereby corrected as shown below:

Title page, Section [56], column 1, replace "4,098,696" with
-- 4,098,690 --.

Signed and Sealed this

Eleventh Day of June, 1991

Attest:

HARRY F. MANBECK, JR.

Attesting Officer

Commissioner of Patents and Trademarks